United States Patent [19]
Mailloux et al.

[11] Patent Number: 5,408,329
[45] Date of Patent: Apr. 18, 1995

[54] IMAGE ENHANCEMENT THROUGH DIGITAL DARKNESS CONTROL

[75] Inventors: Louis D. Mailloux, Fairport; Brendan C. Casey, Webster, both of N.Y.

[73] Assignee: Xerox Corporation, Stamford, Conn.

[21] Appl. No.: 941,828

[22] Filed: Sep. 8, 1992

[51] Int. Cl.⁶ .................... H04N 1/387; G01D 15/14
[52] U.S. Cl. .................... 358/298; 347/131
[58] Field of Search ............ 358/298, 448, 456, 457, 358/458, 459, 461; 346/108, 160; 382/54, 55

[56] References Cited

U.S. PATENT DOCUMENTS

| | | | |
|---|---|---|---|
| 4,437,122 | 3/1984 | Walsh et al. | 358/166 |
| 4,450,483 | 5/1984 | Coviello | 358/166 |
| 4,633,327 | 12/1986 | Roetling | 358/283 |
| 4,680,645 | 7/1987 | Dispoto et al. | 358/298 |
| 4,686,542 | 8/1987 | Yip et al. | 346/108 |
| 4,847,641 | 7/1989 | Tung | 346/160 X |
| 4,926,268 | 5/1990 | Kawamura et al. | 358/298 X |
| 4,970,554 | 11/1990 | Rourke | 355/202 |
| 5,045,952 | 9/1991 | Eschbach | 358/466 X |
| 5,050,000 | 9/1991 | Ng | 358/298 |
| 5,081,494 | 1/1992 | Reed et al. | 355/202 |
| 5,258,775 | 11/1993 | Casey et al. | 358/296 X |
| 5,299,308 | 3/1994 | Suzuki et al. | 358/456 X |

*Primary Examiner*—Benjamin R. Fuller
*Assistant Examiner*—Eric Frahm
*Attorney, Agent, or Firm*—Ronald F. Chapuran

[57] ABSTRACT

A printing machine having an imaging surface, a scanning system for modulating a beam and scanning an image onto the imaging surface, a device to designate a variable relative darkness factor, a store for holding a partial array of the image to be reproduced, a comparator for relating the partial array of the image to be reproduced with standard reference formats to produce correlation signals, modulating logic responsive to the correlation signals and the variable relative darkness factor to provide timing adjustments and a modulator for modulating the beam and scanning the image onto the imaging surface in response to the timing adjustments.

3 Claims, 4 Drawing Sheets

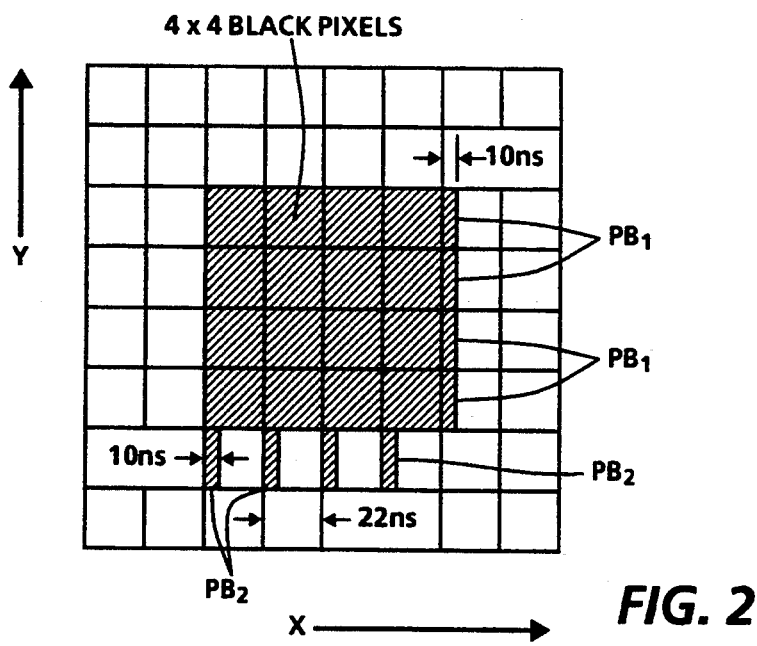
FIG. 2
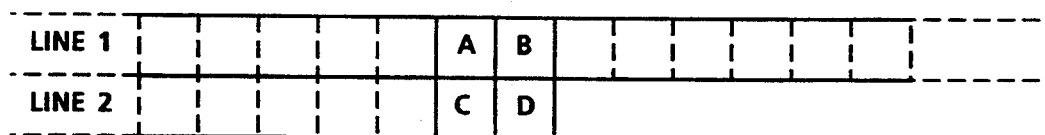
FIG. 3
FIG. 5

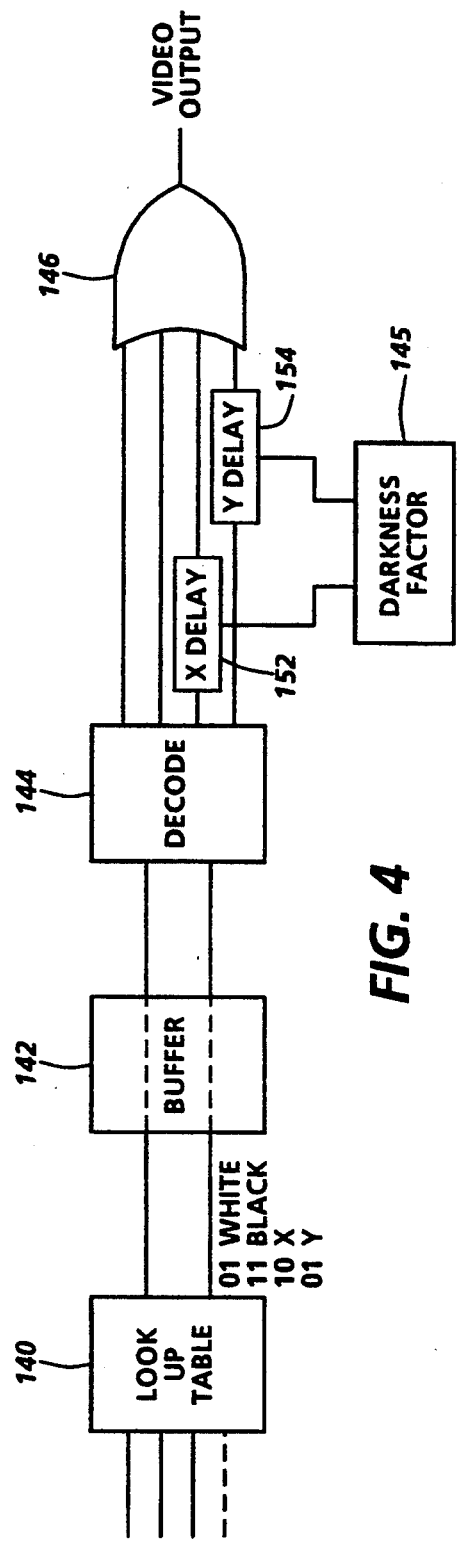
FIG. 4
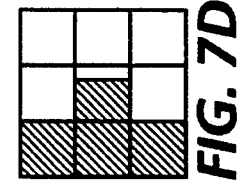
FIG. 7D
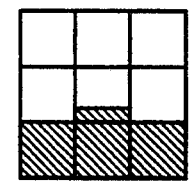
FIG. 7C
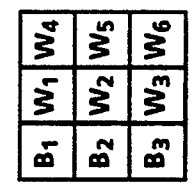
FIG. 7B
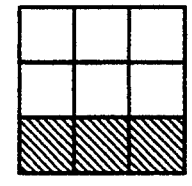
FIG. 7A
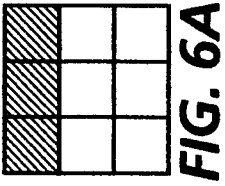
FIG. 6A / FIG. 6B / FIG. 6C / FIG. 6D

IMAGE ENHANCEMENT THROUGH DIGITAL DARKNESS CONTROL

BACKGROUND OF THE INVENTION

The invention relates to image uniformity and compatibility, and more particularly, to image uniformity and compatibility by the use of digital darkness control or pixel stretch techniques in electronic imaging devices regardless of differences in development systems.

Resolution conversion is well known in the prior art. For example, Sharp U.S. Pat. No. 3,573,789 shows a resolution conversion technique by shifting each pixel with surrounding pixels into a resolution expander that automatically produces a multiple number of pixels corresponding to the center pixel. Image enhancement techniques to improve the quality of the image are also well known. For example, Coviello U.S. Pat. No. 4,450,483 statistically analyses a pixel with its surrounding pixels to make a determination whether or not the center pixel should remain as a black or white pixel or be changed to either a black or white pixel to improve the quality of the overall image. Walsh U.S. Pat. No. 4,437,122 does image enhancement of a digital image by taking each pixel of the digital image and a neighborhood surrounding the pixel and comparing this pattern to a set of reference patterns. Depending upon the match between the pixel and its neighborhood with a particular pattern, the center pixel is expanded into a plurality of predetermined pixels enhancing the overall quality of the image.

An ongoing difficulty in the art of recreating and reproducing images on a medium is the desirability of recreating the original image as close as possible regardless of the particular system used in recreating the image. In other words, it is important to match the images or have the images look alike regardless of the particular system in a given machine that is used in developing the image. Because of variances in development systems such as magnetic brush development, cascade development, and liquid development, the reproduced image will necessarily take on different characteristics in the reproduction of portions of the image in such characteristics as line width and solid area development. In addition, within a particular development system itself, the reproduction of a likeness of an original can be further altered by settings such as various degrees of copy quality such as normal, copy light, or copy dark. It is also a challenge in the prior art with multiple font types to be able to closely approximate electronically stored fonts in the reproduced image or text. This often involves painstaking trial and error of electronic representations of fonts and the analysis of the reproduced image. This process is, of course, further complicated, as mentioned above by different development processes that effect the reproduced image.

It would therefore be desirable to provide an electronic adjustment to an original image in order to compensate for various development systems in the prior art as well as to compensate for quality settings within a given development system. It would also be desirable to compensate for the use of different fonts and to be able to match fonts within a reproduction system regardless of the font used and also taking into account the degrees of difference in development systems. It would also be desirable to compensate for variations in prior art systems by the use of an electronic adjustment to an original image that is two dimensional, that is, it can be made in the direction of a scanning beam or in the direction of movement of a medium in relation to the beam.

It is an object of the present invention, therefore, to provide a new an improved technique for improving reproduced images regardless of the development system and regardless of the font. It is another object of the present invention to improve the line delineation of reproduced images by adding pixels or partial pixels in both the X and Y- direction regardless of development characteristics. It is still another object of the present invention to be able to change the size of partial pixels in recreating an image in order to compensate for degrees of settings of the development system. Other advantages of the present invention will become apparent as the following description proceeds, and the features characterizing the invention will be pointed out with particularity in the claims annexed to and forming a part of this specification.

SUMMARY OF THE INVENTION

The present invention is concerned with a printing machine having an imaging surface, a scanning system for modulating a beam and scanning an image onto the imaging surface, a device to designate a relative darkness factor, a store for holding a partial array of the image to be reproduced, a comparator for relating the partial array of the image to be reproduced with standard reference formats to produce correlation signals, modulating logic responsive to the correlation signals and the relative darkness factor to provide timing adjustments, and a modulator for modulating the beam and scanning the image onto the imaging surface in response to the timing adjustments.

For a better understanding of the present invention, reference may be had to the accompanying drawings wherein the same reference numerals have been applied to like parts and wherein:

DETAILED DESCRIPTION OF THE DRAWINGS

FIG. 2 illustrates digital darkness control in both the fast scan and slow scan directions in accordance with the present invention;

FIG. 3 illustrates the digital darkness control technique to enhance image quality using a 2×2 pixel array in accordance with the present invention;

FIG. 4 illustrates a real time hardware implementation of the digital darkness control technique;

FIG. 5 illustrates a 3×3 pixel array corresponding to a set of decoding rules in accordance with the present invention;

FIGS. 6a–6d illustrate a typical darkness adjustment for a given pixel matrix;

FIGS. 7a–7d illustrate another typical darkness adjustment for a given pixel matrix.

DETAILED DESCRIPTION OF THE PREFERRED EMBODIMENT

The present invention is applicable to a wide variety of electronic imaging or printing systems such as typical laser based printing systems. Such systems may often be suitably divided into a scanner section, a controller section, and a printer section. While a specific printing system may be described, the present invention may be used with other types of printing systems such as ink jet, ionographic, etc.

Figure 1:
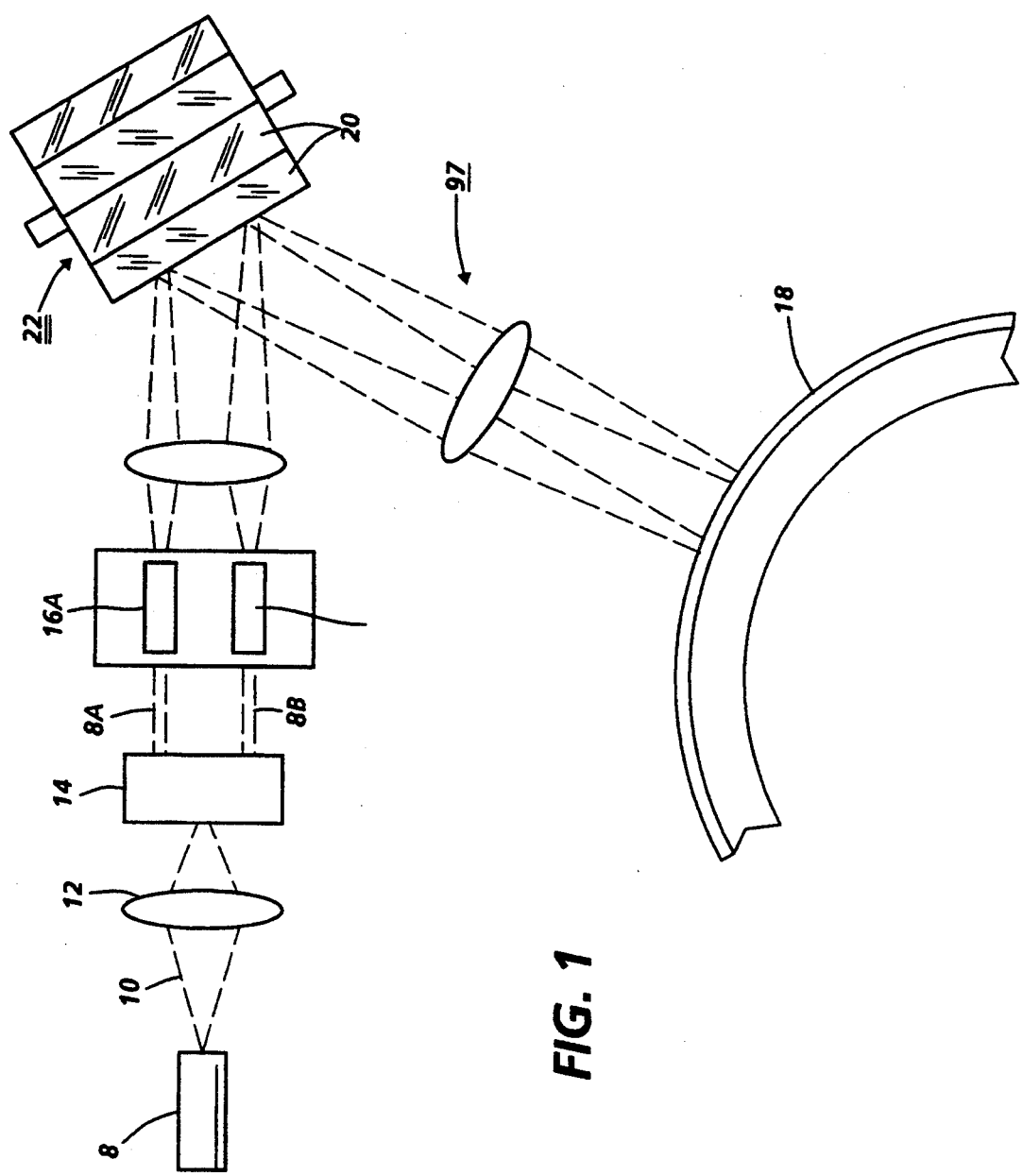
FIG. 1 is a schematic view of a raster output scanner incorporating the present invention.

The printer section typically often comprises a laser type printer separated into a Raster Output Scanner (ROS) section, Print Module Section, Paper Supply section, and Finisher. With reference to FIG. 1, the ROS includes a laser 8 with beam 10 shaped by optics 12 and split into two beams 8a and 8b by beam splitter 14. Each beam 8a, 8b is modulated at 16a, 16b in accordance with the content of an image signal input by an acousto-optic modulator to provide dual imaging beams scanned across a moving photoreceptor 18 by the mirrored facets 20 of a rotating polygon 22 to expose two image lines on the photoreceptor with each scan. This creates the latent electrostatic images represented by the image signal input to a modulator. Photoreceptor 18 is uniformly charged by a corotron at a charging station preparatory to expose the imaging beams. The latent electrostatic images are developed and transferred to print media delivered by a suitable paper supply section.

The print media, may comprise any of a variety of sheet sizes, types, and colors. For transfer, the print media is brought forward in timed registration with the developed image on photoreceptor from suitable paper trays. The developed image transferred to the print media is permanently fixed or fused by a fuser and the resulting prints discharged to either an output tray or to a finisher. Again, it should be understood that it is within the scope of the present invention to be applicable to any suitable projecting or imaging receiving system such as ionographic or ink jet.

A typical controller for such a machine is divided into an image input controller, User interface (UI)-controller, main memory, image manipulation section and image output controller. Scanned image data is compressed by an image compressor, segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in a system memory which comprises a Random Access Memory or RAM pending transfer to the main memory where the data is held pending use.

The User Interface often includes a combined operator controller/CRT display consisting of an interactive touchscreen, keyboard, and mouse, and interfaces the operator with the printing system enabling the operator to program print jobs and other instructions, to obtain system operating information, instructions, programming information, diagnostic information, etc. Items displayed on the touchscreen such as files and icons are actuated by either touching the displayed item on the screen with a finger or by using a mouse to point a cursor to the item selected and keying the mouse.

When the compressed image data in main memory requires further processing, or is required for display on the touchscreen or is required by printer section, the data is accessed in main memory. Where further processing is required, the data is transferred to the image manipulation section where the additional processing steps such as collation, make ready, decomposition, etc. are carried out. Following processing, the data may be returned to main memory or sent to the image output controller.

Image data output to image output controller is decompressed and readied for printing by image generating processors. Following this, the data is output by suitable dispatch processors to the printer section. For additional detail, reference is made to U.S. Pat. No. 5,081,494 and 4,686,542 incorporated herein.

With respect to FIG. 2 in accordance with the present invention, there is illustrated a portion of a scanned image, each square representing either a black B or white W pixel. As shown in FIG. 2, there is a 4×4 black pixel area surrounded by a white pixel area. The process of reproducing an image that is a faithful reproduction of the original image is difficult. For example, the original image is converted to light and dark spots that are used to modulate a laser beam scanning an image receiver. The image on the receiver is then developed with toner and transferred to a copy sheet for fusing. Within this operation, there are inherent difficulties in accurately reproducing a true replica of the original image. For example, often times black lines or black areas can be too constricted or too wide. For example, assume that FIG. 2 represents a correct reproduction of the image as digitally recorded and delivered to the modulating circuitry. However, often times, the finished result is not the best reproduction in either the X-direction, considered to be the fast-scan or beam-scan direction or in the Y-direction, the slow-scan or movement of the receiver belt with respect to the laser beam direction.

Assume that the black line width in the X-direction is too narrow and it would be desirable to increase the width of the black area in the X-direction. By suitable modulating of the laser scanner, as the laser scans in the X-direction, the width of the black line can be increased in the X-direction. This is accomplished by extending the modulation of the beam for a black dot for a portion of time-the beam is sweeping an area that should be a white dot. For example, assume that the time length or period for scan of a pixel in the X-direction is 22 nanoseconds. Then, by extending the black pixel for a period of time, for example, 10 nanoseconds, into a white pixel area, it is possible to extend the black area and in effect widen the black line in the X-direction. This is illustrated in FIG. 2 with respect to the partial black dot areas PBI as shown in the normally white pixel areas. It should be noted that the same effect could be achieved by initiating the black pixel area in the white pixel area preceding the black area. It should also be noted that the same principle applies to decreasing the width of a black line in the X-direction by merely decreasing the time period that the scanning beam is modulated for a black pixel.

In a similar manner, there can be a change in modulation of the laser beam in the Y-direction or the slow-scan direction as illustrated. In this case, the effect of an increase in the width of the black line in the Y-direction is shown as being achieved by scanning partial black dots PBZ as illustrated. That is, partial black pixel is in each next adjoining pixel area to the black pixels in the Y-direction are provided. Typically, a 10 nanosecond period for the black pixel in the X-direction is provided for the entire area of the pixel area in the Y-direction. Although this may appear to be disjointed, the overall effect on the human eye on a developed image is to extend or widen the perceived black line in the Y-direction.

Simple logic can be used to process the pixels. For example, with reference to FIG. 3, there is illustrated two laser scan lines showing four pixel elements A, B, C and D. A scan line buffer of the previous scan line, in this case, line 1 as shown, can be provided as well as a bit buffer of the previously printed bit, in this case the bit buffer holding pixel C from line 2. This allows the pixels to be stretched or constricted in two dimensions as illustrated with respect to FIG. 2.

Thus, in the 2×2 illustration of FIG. 3, in the X or fast-scan direction in order to increase or partially stretch the black pixel, the following logic can be used. If D is white and C is black, then extend D fractionally beyond C. This can be considered an X-adjust. If D is white and C is white and A or B is black, then make D a fractional black pulse (Y adjust). In all other situations D=D. These X and Y fractional pulses could be different or they could be the same size and adjusted with one control. The 2×2 pixel array could be expanded to a 3×3 array or larger. This would require additional buffering of scan lines and preferably a table look-up.

In accordance with the present invention, FIG. 4 illustrates a typical hardware implementation of the pixel alteration scheme. To provide a 3×3 pixel array, it would be necessary to buffer 3 lines of data as illustrated in FIG. 5. The 3×3 array illustrated in FIG. 5 would be compared with look-up table 140 and the results being a two-bit output, 00 being a white pixel, 11 being a black pixel, 10 being a delayed pixel in the X-direction and 01 being a delayed pixel in the Y-direction. The results of the look-up table would be buffered as shown in 142 and decoded and modulated as illustrated at 144 to provide the suitable video output signal through gate 146.

The following rules have provided excellent results in generating images in accordance with the above-described scheme for a 3×3 matrix as shown in FIG. 5.

If pixel E is black, then make the output 11.

The output is 10 or an X-adjustment, if D is black and E, I, F, C, or H are white, or E, I, F, C, and B are white. A 01 or Y-adjustment is made if A is black and E, I, C, F, H, G, and D are white.

Or if D, B and C are black and E, F, G, H, and I are white. Or D, H and I are black and E, F, A, B, and C are white.

Or if B is black and E, I, G, H, and D are white.

Otherwise the output is white or 00

The modulation of the video beam is also responsive to a relative darkness factor logic as shown at 145. It is well known in the art to compensate for high or low density originals, such as a light original. In the prior art, compensation was achieved by changing the electrical bias in the development system. For example, in a typical magnetic brush development system, to allow for a high density original, the developing bias on the magnetic brushes would be set higher than normal. For low density images, the development bias would be less than normal. By analogy, these same type of adjustments can be done by modulating a laser beam to provide partial pixels in the reproduced image. A density level or darkness factor is converted to modulation timing to provide these partial pixels in both x and y-directions. Thus, the darkness factor logic 145 adjusts X delay circuitry 152 and Y delay circuitry 154 as appropriate.

In accordance with the present invention, for each pixel of the original image, a series of decisions must be made. The first decision is whether or not a change is to be made to that particular pixel. If a change is required, the next decision is whether or not to make the change in the X or the Y-direction. Finally, a decision is made on the amount or size of change in either the X or the Y-direction. A component in the amount of change is the relative darkness factor. To make this determination, each pixel and a neighborhood of pixels surrounding the target pixel are examined. For purposes of explanation, it will be assumed that a 3×3 matrix of pixels is examined with the target pixel or the pixel to be changed being the center pixel. It should be understood that any matrix or area of pixels is contemplated within the scope of this invention to be analyzed such as a 2×2 matrix a 4×4 matrix or any other appropriate number of pixels surrounding a target pixel.

With reference to FIG. 6a, there is disclosed a 3×3 matrix of pixels of original image, in this case the three pixels in the top row being black as designated in FIG. 6b $B_1$, $B_2$ and $B_3$, the pixels in the middle row being white as designated by $W_1$, $W_2$, and $W_3$, and the three pixels in the bottom row of the matrix also being white as designated by W4, W5 and W6. As is well known in the prior art, the pixels to be analyzed are stored in a suitable buffer registers with the black pixels $B_1$, $B_2$ and $B_3$ representing the appropriate pixels or the image to be scanned in the line immediately above the target pixel, the pixels $W_1$, $W_2$, and $W_3$ representing the three pixels in the line of the target pixel $W_2$ immediately below the pixels of line 1, and the pixels W4, W5 and W6 representing the appropriate pixels from the line immediately below the line containing the target pixel.

In accordance with the present invention, the adjustment to each center pixel, if any, will be determined by the nature of the pixels surrounding the center or target pixel. This is done in accordance predetermined rules or logic for each 3×3 matrix situation. The configuration as illustrated in FIG. 6b dictates that the center or target pixel W2 be partially changed to black in the Y-direction, as illustrated in FIG. 6c. As mentioned above, there is another decision as to the size or degree of change of the target pixel. Whereas the decision to change in either the X or Y-direction is a function of the target pixel and the neighboring pixels, the size of the change is dependent upon the development device within the particular reproduction system. This can be a function of two variables, one being the particular development system such as a magnetic development system or cascade development system and is predetermined. The other variable is the degree of setting such as copy light or copy dark within a particular development system. FIG. 6c illustrates the degree of change for a particular development system with a degree of darkness setting that is relatively high, and FIG. 6d illustrates the amount of change of the target pixel for a degree of darkness setting that is relatively low. Thus, FIGS. 6c and 6d illustrate the degree of difference of a partial pixel depending upon the degree of setting for a particular development system.

In a similar manner changes can be made in the X-direction with the amount of change being primarily a function of a relative darkness setting. With reference to FIGS. 7a thru 7d there is illustrated a typical scenario for a matrix of pixels. In this particular case, the top row of pixels are B1, W1 and W2, the second row are B2, W3 and W4, and the bottom row B3, W5 and W6. As shown in FIG. 7b this particular configuration dictates the direction of change to be in the X-direction. FIGS. 7c and 7d illustrate the degree of change or the different darkness settings, in particular a relatively dark setting in FIG. 7d and a relatively light setting in FIG. 7c.

Figure 8:
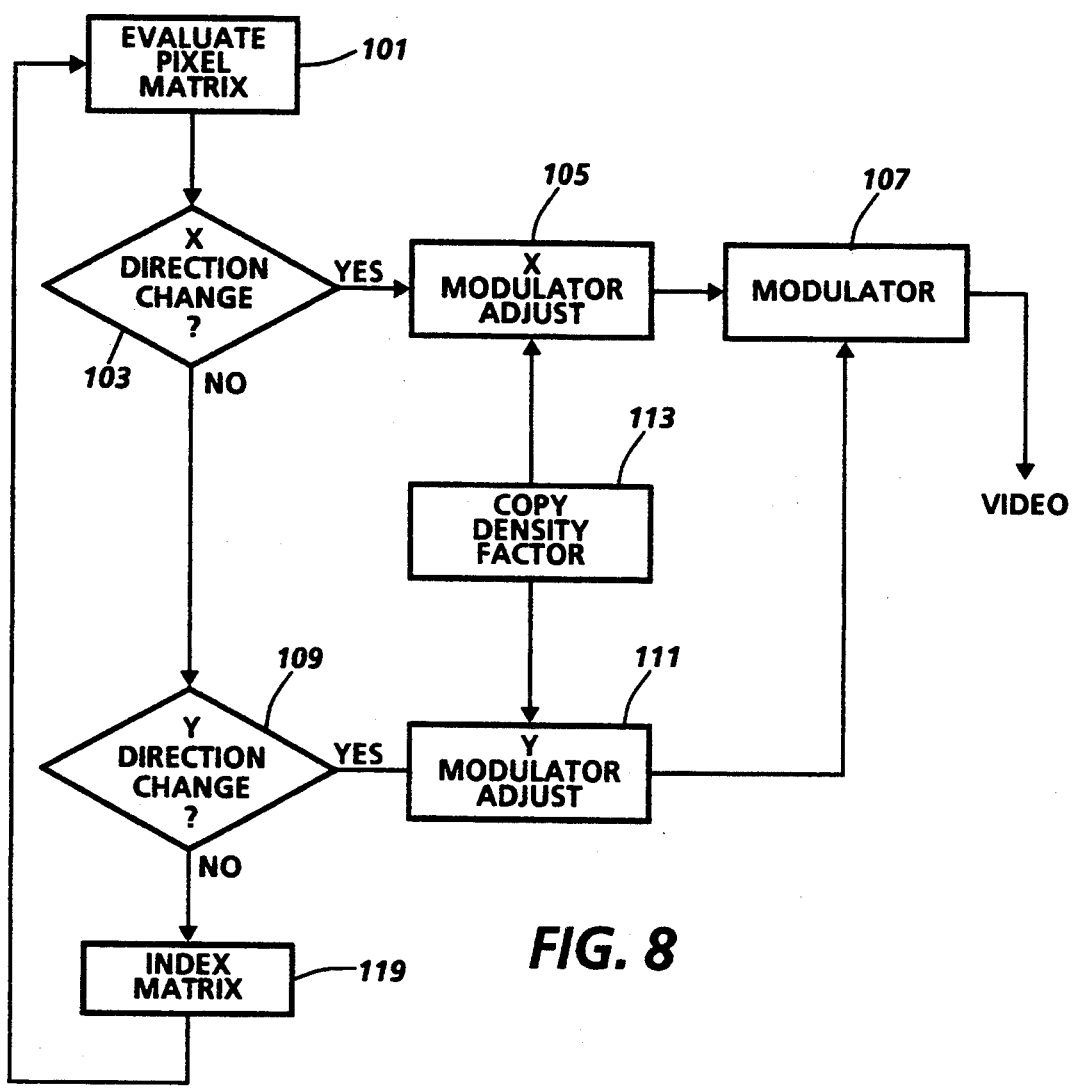
FIG. 8 is a flow chart illustrating digital darkness control in accordance with the present invention.

FIG. 8 is a flow chart showing digital darkness control. A matrix of pixels is evaluated as illustrated in block 101. A determination of whether or not there is an x-direction change is made at block 103. If there is an x-direction then, there is a determination of the degree of modulation adjustment in the x-direction at 105 applied to modulator 107. In a similar manner there is a determination of whether there is a y-direction change at block 109, if so, the proper modulation adjustment is determined at 111 and applied to the modulator at 107. The X-modulation adjust 105 and Y-modulation adjust 111 also receive a copy density or relative darkness adjustment shown at 113. After each pass for a target pixel, the matrix is indexed to analyze the next target pixel and its neighbors shown at 119.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

It is claimed:

1. A method of reproducing an image in a printing machine having a moving imaging surface and a projecting system for modulating a beam and projecting an image onto the imaging surface for transfer of the image to a medium, the beam being scanned in a first direction, the imaging surface being moved in a second direction, the printing machine including an operator interface to enable a setting of a predetermined copy quality condition of the image to be transferred to the medium, the image including an array of pixels, each pixel representing an image area, each pixel being represented by either a first state or a second state, comprising the steps of;

holding in a memory a matrix of pixels of the image, one of the pixels being a target pixel, the target pixel being in said first state, recognizing a state of the target pixel and pixels surrounding the target pixel, detecting the setting of the copy quality condition of the image, and responding to the state of the target pixel and the pixels surrounding the target pixel and to the setting of the copy quality condition to change a state of a portion of the target pixel to said second state, the change being in relation to either the first direction or second direction.

2. The method of claim 1 wherein the step of changing the state of a portion of the target pixel from said first state to said second state includes a step of adjusting a timing of the modulating of the beam.

3. The method of claim 2 wherein the first state is white and the second state is black including a step of changing a portion of the target pixel from white to black.

* * * * *